July 9, 1957  E. E. TINKER  2,798,613
STRAINER

Filed May 26, 1953  2 Sheets-Sheet 1

INVENTOR
EARL E. TINKER

BY Norman S. Blodgett
ATTORNEY

July 9, 1957

E. E. TINKER 2,798,613

STRAINER

Filed May 26, 1953

2 Sheets-Sheet 2

INVENTOR
EARL E. TINKER

BY Norman S. Blodgett

ATTORNEY

United States Patent Office 2,798,613
Patented July 9, 1957

2,798,613

STRAINER

Earl E. Tinker, Decatur, Ill., assignor to A. W. Cash Company, Decatur, Ill., a corporation of Illinois Application May 26, 1953, Serial No. 357,447

7 Claims. (Cl. 210—446)

This invention relates to a strainer and more particularly to an apparatus arranged to remove foreign matter from the liquid in a fluid flow system.

In the past many devices have been devised for removing undesirable foreign matter from the liquid flowing in conduits and pipes in various hydraulic apparatus. One of the difficulties most often experienced with this type of device is that the filtering element is not easily removed for cleaning or replacement. Furthermore, the filtering element is very often a tubular screen of more or less expensive construction. Also, in using a tubular screen for a filtering element it has been necessary to cause the flow to take place in an irregular path, thus introducing turbulent and frictional effects into the fluid system. The present invention obviates the difficulties of the prior art in a novel manner.

It is therefore an outstanding object of the invention to provide a strainer having a filtering element which is easily removed for replacement or cleaning.

Another object of the present invention is the provision of a strainer making use of an inexpensive and easily fabricated filtering element.

It is a further object of the invention to provide a strainer having straight-through flow characteristics.

It is a still further object of the present invention to provide a strainer having an unusual arrangement of filter element providing an extremely large straining area for removing foreign material from the fluid in the system.

Figure 1:
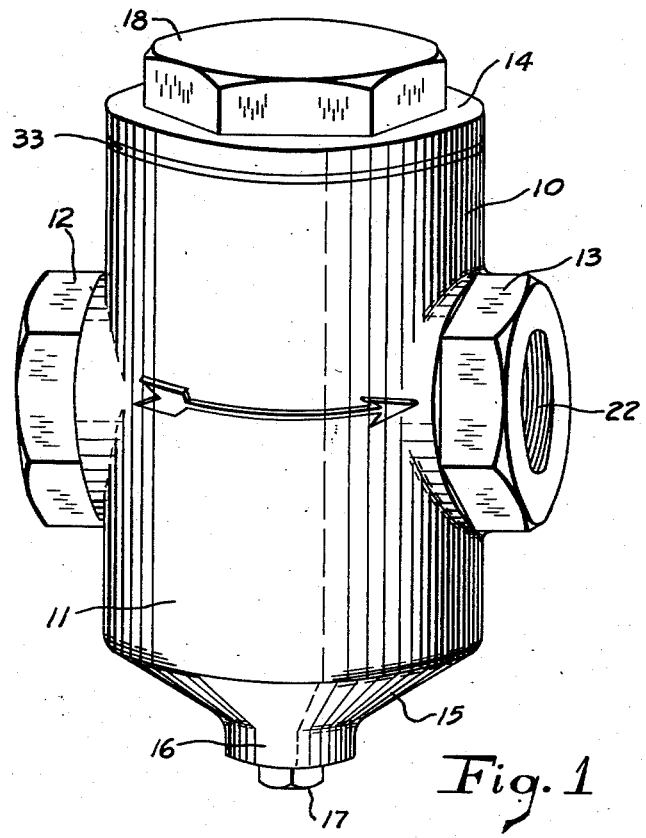
Figure 4:
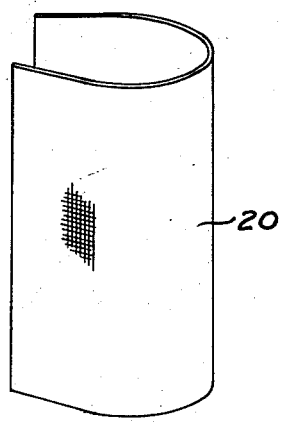
Figure 2:
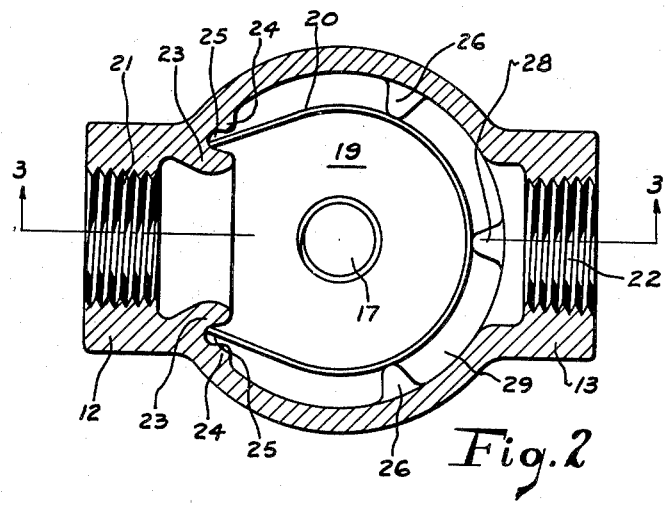
Figure 3:
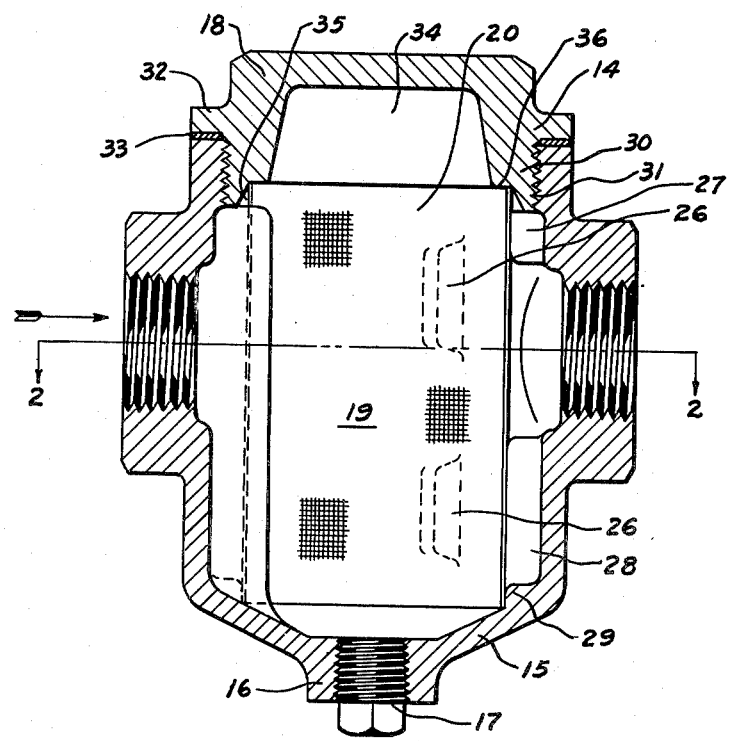

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which:

Figure 1 is a prospective view of a strainer embodying the principles of the present invention, Figure 2 is a sectional view of the invention taken on the line 2—2 of Figure 3, Figure 3 is a sectional view of the invention taken on the line 3—3 of Figure 2, and Figure 4 is a prospective view of the filtering element used in the invention. Like reference characters denote similar parts in the several figures of the drawings.

Referring first to Figure 1, wherein are shown the general features of the invention, the strainer, indicated generally by the reference numeral 10, is shown as comprising a main hollow cylindrical body 11, an inlet boss 12, and an outlet boss 13. The body 11 is intended to be mounted vertically in a horizontal pipe section with the bosses 12 and 13 extending horizontally from diametrically opposite sides thereof. As is evident in the figure, the bosses 12 and 13 are provided with flats to form a hexagonal wrench surface. The top of the body 11 is open and a top member 14 acts as a closure therefor. The lower portion of the body 11 is provided with an integral bottom 15 of generally frusto-conical conformation. A boss 16 extends axially therefrom and has a plug 17 screwed therein. The top member 14 is provided with a hexagonal boss 18 extending centrally therefrom and adapted to be grasped by a wrench.

As is evident in Figures 2 and 3, the body 11 is provided with a generally cylindrical inner chamber 19 in which resides a screen 20. A threaded passage 21 passes through the inlet boss 12 into the chamber 19, while a similar threaded passage 22 extends from the chamber 19 through the outlet boss 13. The inner surface of the bottom 15 is of a generally frusto-conical conformation merging, of course, with the cylindrical walls of the chamber 19. Two vertical ribs 23 extend axially through the chamber 19 from the bottom 15 to the upper portion of the body 11. One of these ribs resides on each side of the intersection of the passage 21 with the chamber 19 and they are generally of smooth conformation presenting no obstacle to the flow of fluid through the passage 21 into the chamber 19. Parallel to each rib 23 and on a side thereof remote from the passage 21 is a small rib 24. The sides of the ribs 23 and 24 which face each other are curved and define a rounded vertical groove 25. Also extending from the cylindrical wall of the chamber 19 are vertical support lugs 26. These lugs are spaced on either side of the outlet passage 22 and are also spaced above and below this passage. The inner surfaces of the lugs 26 are rounded, as is evident in Figure 2, to present a smooth rounded surface toward the interior of the chamber. A similar support lug 27 extends outwardly from the wall of the chamber 19 and is located generally in the vertical plane including the axes of the passages 21 and 22, but the lug extends upwardly from the passage 22 to a point near the top of the body 11. Another support lug 28 of similar conformation extends from the passage 22 downwardly to the bottom 15. A shoulder 29 extends around the lower portion of the body 11 and has a generally horizontal surface intersecting the inner surface of the bottom 15. The lug 28 merges with the shoulder 29 as do the vertical ribs 23 and 24.

As is evident in Figure 3, the top member 14 is provided with a reduced threaded portion 30 which screws into a threaded portion 31 of the body 11, which threaded portion is generally a continuation of the cylindrical surface of the chamber 19. The top member 14 has an annular shoulder 32 extending radially therefrom and between the shoulder 32 and the end of the body 11 is inserted a gasket 33. The inwardly facing side of the top member 14 is provided with a deep narrow frusto-conical depression 34 extending upwardly therein. This depression 34 merges with a relatively shallow yet broader recess 35 which is also of generally frusto-conical conformation. The depression 34 and the recess 35 are joined by a generally horizontal plane surface 36.

Figure 4 demonstrates the manner in which the screen 20 is formed of ordinary screen material cut into a rectangle and bent into a generally horseshoe shape before insertion into the strainer.

The arrangement and operation of the invention will now be understood in view of the above description. The strainer 10 is inserted into a horizontal section of pipe by threading the incoming pipe into the threaded aperture 21 of the boss 12 and threading the outlet section of the pipe into the passage 22 of the boss 13. With the top member 14 removed, the screen 20, which has been formed into a horse shoe cross-sectional shape, is dropped into the chamber 19 with its free vertical edges residing in the grooves 25 and its bight pressing against the lugs 26, 27, and 28. The lower edge of the screen 20 rests on the inner surface of the bottom 15 with the lower portion pressed against the vertical surface of the shoulder 29. The threaded portion 30 of the top member 14 is threaded into the threaded portion 31 of the body with the gasket 33 in place between the shoulder 32 and the body. As the top member is threaded downwardly into the body, the top edge of the screen 20 is engaged by the plane surface 36 which is the transition surface between the depression 34 and the recess 35. When water is admitted to the system, it enters the strainer through the passage 21 and passes into the chamber 19 on the inside of the screen 20. The water passes outwardly through the screen 20 and eventually leaves the strainer through the passage 22. The velocity pressure of the fluid passing through the strainer presses the screen 20 against the lugs 26, 27, and 28 which thus support it. The pressure of fluid flow also presses the free vertical edges of the screen which reside in the grooves 25 backwardly against the rib 24 to provide a seal. At the lower portion of the screen the fluid pressure presses the screen against the vertical surface of the shoulder 29, thus preventing leakage of fluid therearound. At the upper edge the screen is pressed against the frusto-conical wall of the recess 35, thus providing a tight seal. In addition, the screw-down pressure of the top member 14 clamps the screen 20 between the inner surface of the bottom 15 and the plane surface 36 of the top member. It can be seen, then, that the fluid pressure and the clamping action of the top member 14 provide for the screen 20 being fully supported and tightly sealed. The plug 17 is available for blowing down the strainer and removing sediment collected in the bottom thereof. It can be seen then that the screen 20 is of very simple construction which can be readily formed of ordinary screen material in the field; that, despite this simple construction, means is provided for assuring that all the fluid passes through the screen and none leaks around. Furthermore, it is to be noted that the filtering or screening action takes place over almost an entire cylindrical area, although, of course, it is intended that the major portion of the straining be done within or close to the area of the screen 20 intersected by the cylinder defined by the passages 21 and 22 so that straight-line flow results.

It is to be understood that although the strainer has been described in use in a horizontal section of pipe, it could very well be used in any position.

While certain novel features of the invention have been shown and described and are pointed out in the annexed claims, it will be understood that various omissions, substitutions, and changes in the forms and details of the device illustrated and in its operation may be made by those skilled in the art without departing from the spirit of the invention.

Having thus described my invention, what I claim as new and desire to secure by Letters Patent is:

1. A strainer comprising a generally cylindrical inner chamber having an inlet passage and an outlet passage, and a screen residing in the chamber, said screen having a generally U-shaped conformation, and a U-shaped axial groove in the wall of the chamber on either side of the inlet passage closely adjacent thereto, the extremities of the U-shaped screen lying in the said grooves.

2. A strainer comprising a body having an inner surface defining a generally cylindrical chamber having an inlet passage and an outlet passage, and a rectangular screen residing in the chamber, said screen being bent into a conformation having a U-shaped section, and a U-shaped axial groove in the inner surface of the body on either side of the inlet passage closely adjacent thereto, the extremities of the U-shaped screen lying in the said grooves.

3. A strainer, comprising a body having an inner surface defining a chamber having an inlet passage and an outlet passage, a rectangular screen bent to have a U-shaped section, and a top member threadedly associated with the body and engaging the screen so that the screen is clamped between the top member and the bottom of the chamber, and U-shaped axial grooves in the inner surface of the body, one on each side of the inlet passage and closely adjacent thereto, edges of the U-shaped screen lying in said grooves.

4. A strainer, comprising a body having an inner surface defining a generally cylindrical chamber having an inlet passage and an outlet passage, a rectangular screen residing in the chamber, said screen being bent into a conformation having a U-shaped section, and a top member threadedly associated with the body and engaging the edges of the screen so that the screen is clamped between the top member and the bottom of the chamber, there being U-shaped axial grooves in the inner surface of the body, one on each side of the inlet passage and closely adjacent thereto, the edges of the U-shaped screen which are parallel to the axis of the chamber lying in said grooves.

5. A strainer, comprising a body having an inlet passage and having an inner surface defining a generally cylindrical chamber, a rectangular screen bent into a conformation of U-shaped cross-section residing in the chamber, two spaced U-shaped axial grooves in the inner surface of the body one on each side of and adjacent to the inlet passage in which grooves lie the edges of the screen which are parallel to the axis of the chamber, lugs extending from the inner surface of the body axially therealong for contacting and constituting substantially the entire support for the bight of the screen, an annular shoulder extending around one end of the chamber and entirely engaging and supporting one non-axial edge of the screen, and a top member threadedly engaging the body and having a surface entirely engaging the other non-axial edge of the screen so that the screen is clamped between the top member and the said one edge of the chamber adjacent the shoulder.

6. A strainer, comprising a body having an inlet passage and having an inner surface defining a generally cylindrical chamber, a rectangular screen bent into a conformation of U-shaped cross-section residing in the chamber, two spaced U-shaped axial grooves in the inner surface of the body one on each side of and adjacent to the inlet passage in which grooves lie the edges of the screen which are parallel to the axis of the chamber, and lugs extending from the inner surface of the body axially therealong for contacting and constituting the principal support for the bight of the screen.

7. A strainer, comprising a body having an inlet passage and having an inner surface defining a generally cylindrical chamber, a rectangular screen bent to conform generally to the shape of the chamber and residing therein, two spaced U-shaped axial grooves in the inner surface of the body one on each side of and adjacent to the inlet passage in which grooves lie the edges of the screen which are parallel to the axis of the chamber, lugs extending from the inner surface of the body axially therealong for contacting and constituting substantially the entire support for the bight of the screen, an annular shoulder extending around one end of the chamber and entirely engaging and supporting one non-axial edge of the screen, and a top member threadedly engaging the body and having a surface entirely engaging the other non-axial edge of the screen so that the screen is clamped between the top member and the said one end of the chamber adjacent the shoulder.

References Cited in the file of this patent

UNITED STATES PATENTS

| | | |
|---|---|---|
| 1,631,822 | Jahn | June 7, 1927 |
| 1,675,200 | Smith | June 26, 1928 |
| 1,908,925 | Semon et al. | May 16, 1933 |
| 2,399,994 | Feagan | May 7, 1946 |
| 2,644,586 | Cutter | July 7, 1953 |
| 2,661,096 | Tinker | Dec. 1, 1953 |

FOREIGN PATENTS

| | | |
|---|---|---|
| 574,206 | Great Britain | Dec. 27, 1945 |